(12) United States Patent
Robarge et al.

(10) Patent No.: US 8,405,364 B2
(45) Date of Patent: Mar. 26, 2013

(54) APPARATUS FOR CONTROLLING CAPACITOR CHARGE STATUS AND METHOD OF ASSEMBLY

(75) Inventors: Dean Arthur Robarge, Southington, CT (US); Michael Paul Lafond, Wallingford, CT (US); John Kenneth Hooker, Louisville, KY (US); Daniel Edward Delfino, West Hartford, CT (US); Hardik Upadhyay, Monroe, CT (US); Aaron Edward Engel, Wethersfield, CT (US)

(73) Assignee: General Electric Company, Schenectady, NY (US)

( * ) Notice: Subject to any disclaimer, the term of this patent is extended or adjusted under 35 U.S.C. 154(b) by 360 days.

(21) Appl. No.: 12/874,330

(22) Filed: Sep. 2, 2010

(65) Prior Publication Data

US 2012/0056599 A1 Mar. 8, 2012

(51) Int. Cl.
*H01M 10/46* (2006.01)
(52) U.S. Cl. .................................................... 320/166
(58) Field of Classification Search .............. 320/107, 320/128, 166, 167; 361/271
See application file for complete search history.

(56) References Cited

U.S. PATENT DOCUMENTS

| | | | |
|---|---|---|---|
| 5,836,972 A | 11/1998 | Stendahl et al. | |
| 6,005,370 A | 12/1999 | Gustavson et al. | |
| 6,518,733 B1 | 2/2003 | Schenkel et al. | |
| 7,190,102 B2* | 3/2007 | VanderSluis | 320/166 |
| 7,330,361 B1 | 2/2008 | Chu | |
| 7,411,374 B2 | 8/2008 | Tan et al. | |
| 7,710,080 B2 | 5/2010 | Kobayashi et al. | |
| 2010/0226050 A1* | 9/2010 | Koo et al. | 361/18 |

* cited by examiner

*Primary Examiner* — Edward Tso
(74) *Attorney, Agent, or Firm* — Global Patent Operation

(57) ABSTRACT

A capacitor charge control assembly for use with a circuit protection device that includes at least one activation capacitor, including at least one input device configured to receive first and second user inputs, and a linkage assembly coupled to the at least one input device such that the at least one input device is movable between a first position and an opposite second position. The control assembly also includes at least one switch coupled to the at least one input device and configured to generate one of a first signal and a second signal, wherein the first signal is based on the first user input and the second signal is based on the second user input, and wherein the first signal causes the at least one activation capacitor to discharge stored energy and the second signal causes the at least one activation capacitor to store energy.

20 Claims, 10 Drawing Sheets

APPARATUS FOR CONTROLLING CAPACITOR CHARGE STATUS AND METHOD OF ASSEMBLY

BACKGROUND OF THE INVENTION

The embodiments described herein relate generally to a power equipment protection system and, more particularly, to an apparatus for use in controlling a charge status of a plurality of capacitors of a circuit protection device.

Known electric power circuits and switchgear generally have conductors that are separated by insulation, such as air, or gas or solid dielectrics. However, if the conductors are positioned too closely together, or if a voltage between the conductors exceeds the insulative properties of the insulation between the conductors, an arc can occur. For example, the insulation between the conductors can become ionized, which makes the insulation conductive and enables formation of an arc flash.

An arc flash includes a rapid release of energy due to a fault between two phase conductors, between a phase conductor and a neutral conductor, or between a phase conductor and a ground point. Arc flash temperatures can reach or exceed 20,000° C., which can vaporize the conductors and adjacent equipment. Moreover, an arc flash can release significant energy in the form of not only heat, but also intense light, pressure waves, and/or sound waves, sufficient to damage the conductors and adjacent equipment. However, the current level of a fault that generates an arc flash is generally less than the current level of a short circuit, such that a circuit breaker generally does not trip or exhibits a delayed trip unless the circuit breaker is specifically designed to handle an arc fault condition. Although agencies and standards exist to regulate arc flash issues by mandating the use of personal protective clothing and equipment, there is no device established by regulation that eliminates arc flash.

At least some known circuit protection devices include a number of high voltage and high energy capacitors for use in initiating a secondary arc flash within an enclosure that is designed to safely contain the energy released by the secondary arc flash. These capacitors can be used to provide energy to an ablative plasma gun that releases plasma into a gap between a plurality of electrodes to facilitate formation of the secondary arc flash. However, it is difficult to observe the charge status of these capacitors. Unracking these circuit protection devices while the capacitors are charged or are charging can lead to severe electrical shocks or burns if an operator were to come into contact with the capacitors. Accordingly, it is desirable to provide a means of observing the charge status of the capacitors and/or a means to alter the charge status of the capacitors.

BRIEF DESCRIPTION OF THE INVENTION

In one aspect, a capacitor charge control assembly is provided for use with a circuit protection device that includes at least one activation capacitor. The control assembly includes at least one input device configured to receive a first user input and a second user input, and a linkage assembly coupled to the at least one input device such that the at least one input device is movable between a first position and second position. The control assembly also includes at least one switch coupled to the at least one input device and configured to generate one of a first signal and a second signal, wherein the first signal is based on the first user input and the second signal is based on the second user input, and wherein the first signal causes the at least one activation capacitor to discharge stored energy and the second signal causes the at least one activation capacitor to store energy.

In another aspect, a controller is provided for use with a circuit protection device. The controller includes a logic circuit and a plurality of capacitors electrically coupled to the logic circuit and configured to initiate operation of the circuit protection device. The controller also includes a charge control assembly including at least one input device configured to receive a first user input and a second user input, and a linkage assembly coupled to the at least one input device such that the at least one input device is movable between a first position and second position. The control assembly also includes a switch coupled to the at least one input device and configured to generate a first signal based on the first user input and a second signal based on the second user input, wherein the first signal causes the plurality of capacitors to discharge stored energy and the second signal causes the plurality of capacitors to store energy.

In another aspect, a method is provided for assembling a capacitor charge control assembly for use with a circuit protection device that includes a plurality of activation capacitors. The method includes coupling a linkage assembly to at least one input device such that the at least one input device is movable between a first position and second position, and coupling a switch to the at least one input device. The switch is configured to generate a first signal based on a first user input and a second signal based on the second user input, wherein the first signal causes the plurality of capacitors to discharge stored energy and the second signal causes the plurality of capacitors to store energy.

DETAILED DESCRIPTION OF THE INVENTION

Figure 1:
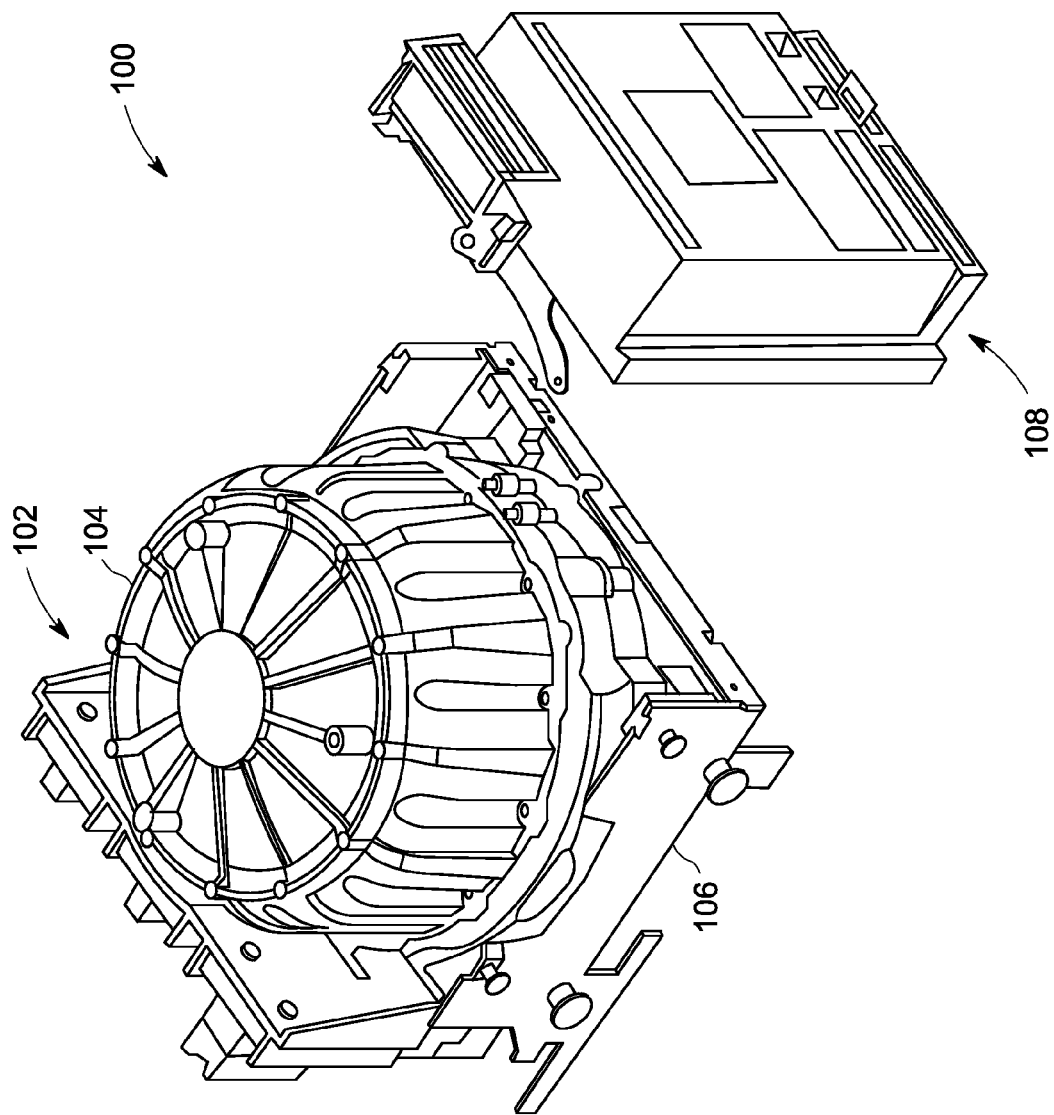
FIG. 1 is a perspective view of an exemplary circuit protection device for use with power distribution equipment.

FIG. 1 is a perspective view of an exemplary circuit protection device 100 for use with power distribution equipment. Device 100 includes a containment assembly 102 that includes a plurality of main electrodes (not shown) separated by a main gap of air or another gas. Each main electrode is coupled to an electrically different portion of a power circuit, such as different phases, neutral, or ground. Containment assembly 102 also includes a trigger circuit (not shown) that activates an ablative plasma gun (not shown) by transmitting an electrical pulse to the plasma gun. In response to the pulse, the plasma gun emits ablative plasma that facilitates the creation of an arc between the main electrodes. The arc is created to divert energy from an arc flash elsewhere on the circuit for protection of the circuit. Moreover, containment assembly 102 includes an outer cover 104 that contains and isolates the energy created by the arc. Containment assembly 102 is sized to be coupled to a cassette 106 so that containment assembly 102 can be inserted into an equipment enclosure. Moreover, device 100 includes a controller 108 that is coupled, such as communicatively coupled, to containment assembly 102. Controller 108 receives signals from one or more sensors (not shown) that monitor the circuit to detect an arc flash. The sensors may monitor a current through a portion of the circuit and/or a voltage across multiple portions of the circuit. The sensors may also detect a light flash that can be produced by an arc flash. In response to the signals, controller 108 activates the plasma gun within containment assembly 102 to initiate an arc.

Figure 2:
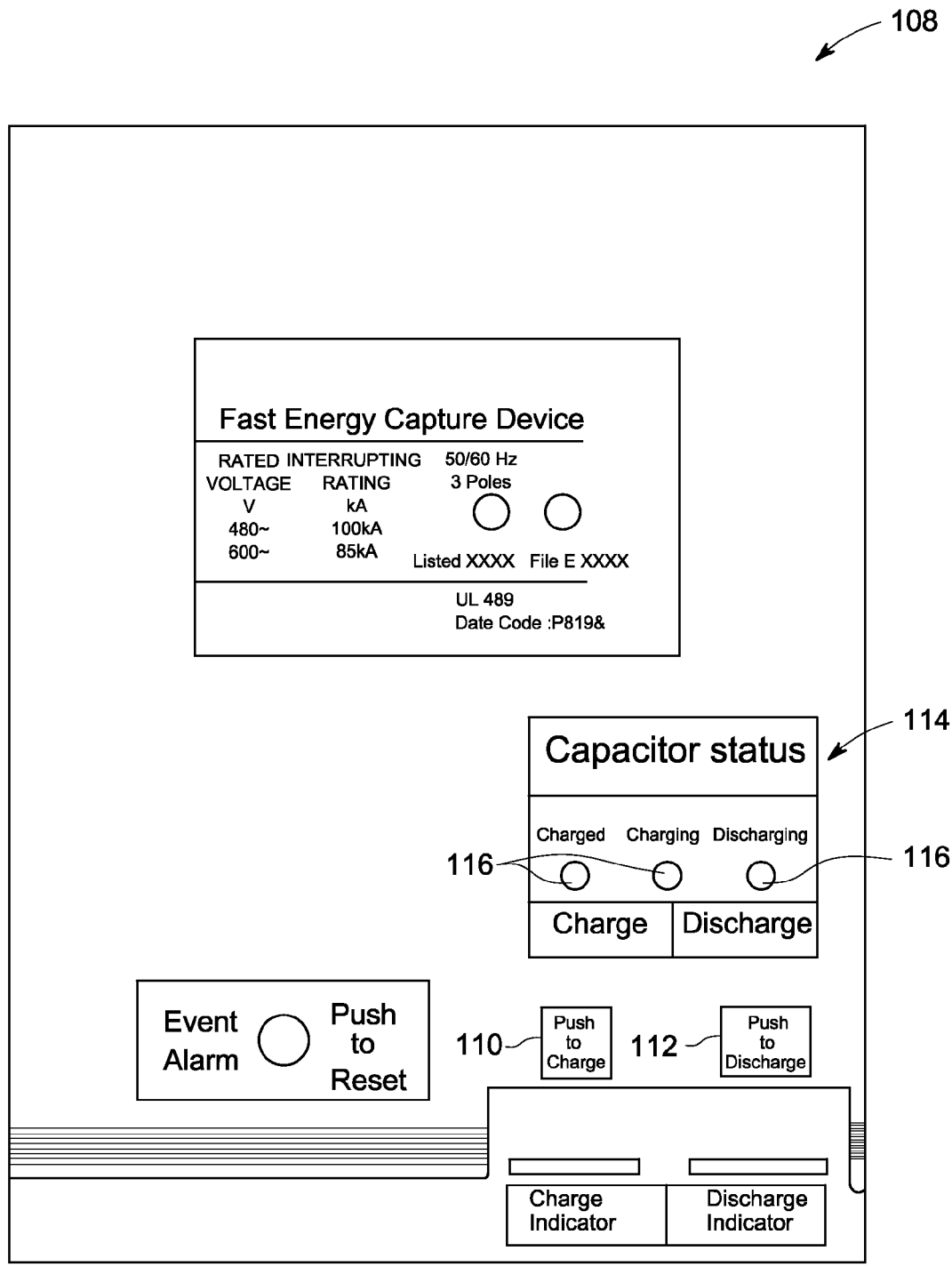
FIG. 2 is a front view of a controller that may be used with the circuit protection device shown in FIG. 1.

FIG. 2 is a front view of controller 108. As shown in FIG. 2, controller 108 includes one or more input devices. In the exemplary embodiment, the input device includes a first input device 110 and a second input device 112. Moreover, first input device 110 is configured to receive a first user input, and second input device 112 is configured to receive a second user input. Each input device 110 and 112 may be, for example, a pushbutton. Alternatively, the input device may be a switch that is adjustable between two positions, a rotary dial, or any other suitable device for receiving a first user input and a second user input. In the exemplary embodiment, the first user input is a button-press of first input device 110 and the second user input is a button-press of second user input 112. In addition, controller 108 includes a status indicator 114 that displays a capacitor charge status via a plurality of light devices 116. For example, status indicator 114 indicates whether a plurality of capacitors is charged, charging, or discharging. Light devices 116 may be, for example, light emitting diodes (LEDs).

Figure 3:
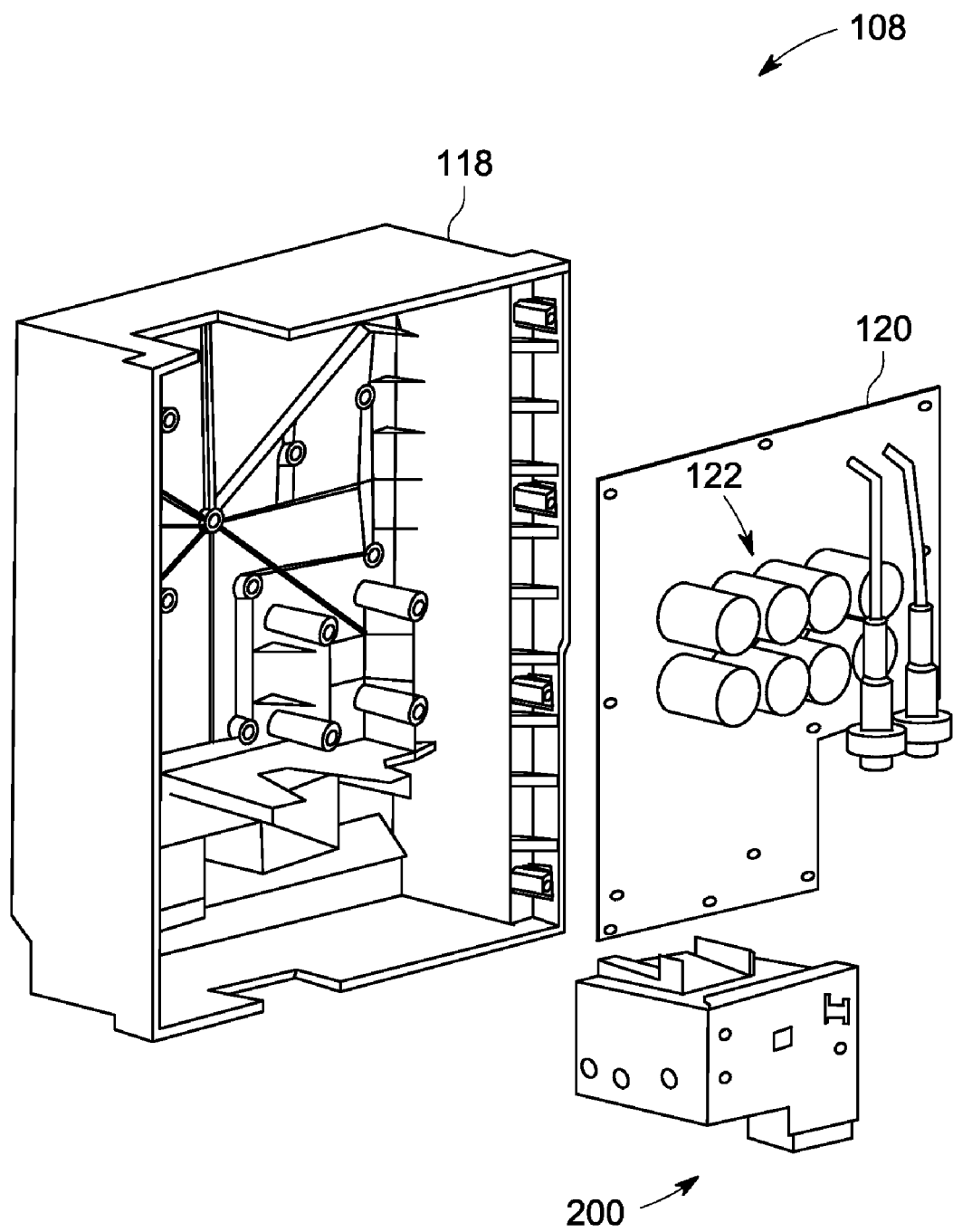
FIG. 3 is a partial exploded view of the controller shown in FIG. 2.

FIG. 3 is a partial exploded view of controller 108, which includes a housing 118 that is sized to contain a printed circuit board (PCB) 120. PCB 120 includes a plurality of capacitors 122 electrically coupled thereto. Capacitors 122 may also be referred to herein as activation capacitors, and are used to provide power to the plasma gun of containment device 102 (shown in FIG. 1) for use in creating an arc within containment device 102. Moreover, controller 108 includes a capacitor charge control assembly 200 that is electrically coupled to PCB 120. As described in greater detail below, control assembly 200 controls a charge status of capacitors 122 according to the first user input and/or the second user input.

Figure 4:
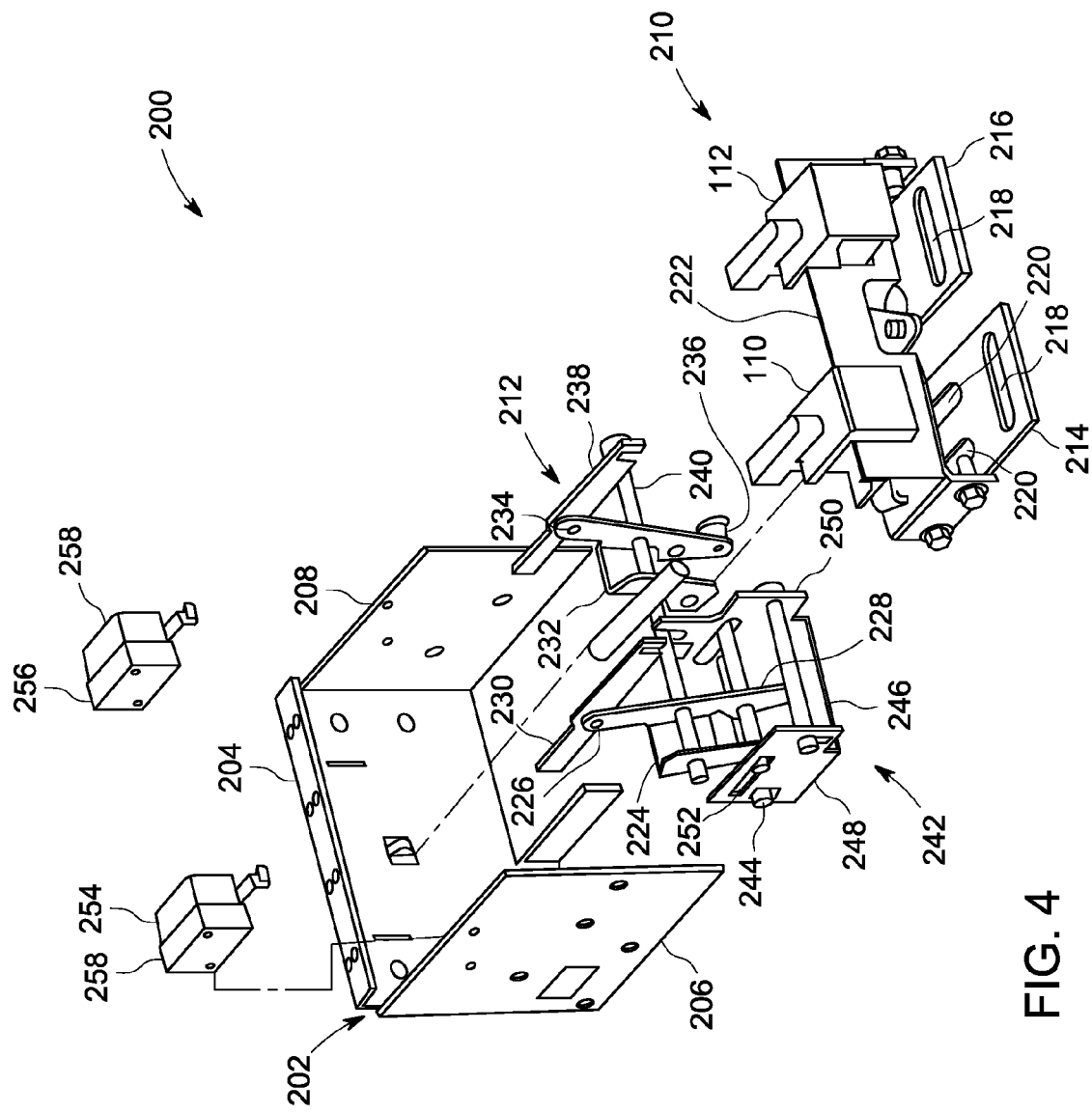
FIG. 4 is an exploded view of a capacitor charge control assembly that may be used with the controller shown in FIGS. 2 and 3.

FIG. 4 is an exploded view of capacitor charge control assembly 200, which includes a housing 202 having a rear wall 204, a first sidewall 206, and an opposite second sidewall 208. Housing 202 couples to housing 118 of controller 108 (both shown in FIG. 3). Moreover, control assembly 200 includes a front assembly 210 and a linkage assembly 212 that is coupled to front assembly 210. In the exemplary embodiment, front assembly 210 includes first input device 110 and second input device 112. Moreover, front assembly 210 includes first lockout portion 214 and a second lockout portion 216. Each lockout portion 214 and 216 includes a hasp slot 218 that enables a user to install a lockout/tagout apparatus to prevent a change in charge status of capacitors 122 (shown in FIG. 3). Moreover, each lockout portion 214 and 216 includes a plurality of guide slots 220 for use in coupling first lockout portion 214 and second lockout portion 216 to first input device 110 and second input device 112, respectively. Specifically, a crank assembly 222 couples first lockout portion 214 and second lockout portion 216 to first input device 110 and second input device 112, respectively, to ensure that only one of first input device 110 and second input device 112 is able to receive user input at any one time.

In the exemplary embodiment, linkage assembly 212 includes a first interlock 224 that includes a top end 226 and an opposite bottom end 228. Moreover, linkage assembly 212 includes a first arm 230 that is coupled to first input device 110 and to first interlock top end 226. Linkage assembly 212 also includes a second interlock 232 that includes a top end 234 and an opposite bottom end 236, and a second arm 238 that is coupled to second input device 112 and to second interlock top end 234. A main shaft 240 extends through first interlock 224 and second interlock 232 such that interlock top ends 226 and 234 are maintained in opposite positions based on which input device 110 and 112 is able to receive user input.

Moreover, control assembly 200 includes a lockout pad 242 that is coupled to linkage assembly 212. Specifically, lockout pad 242 is coupled to first interlock 224 via a plurality of driver arms 244. More specifically, lockout pad 242 includes a bottom surface 246, a first wall 248, and an opposite second wall 250. Each wall 248 and 250 has a plurality of driver slots 252 formed therein and corresponding to a respective driver arm 244.

When first input device 110 receives the first user input, first input device 110 retracts to a first position, which causes first arm 230 to move first interlock top end 226 towards rear wall 204. Main shaft 240 extends through second interlock 232 such that, when first interlock top end 226 moves towards rear wall 204, second interlock top end 234 moves away from rear wall 204. The movement of second interlock top end 234 causes second arm 238 to move second input device 112 outward to a second position. Moreover, when first interlock top end 226 moves towards rear wall 204, driver arms 244 move within driver slots 252 such that lockout pad 242 is moved to an unlocked position wherein lockout pad 242 is retracted at least partially within housing 202. In contrast, when second input device 112 receives the second user input, second input device 112 retracts to the first position, which causes second arm 238 to move second interlock top end 234 towards rear wall 204. Main shaft 240 extends through first interlock 224 such that, when second interlock top end 234 moves towards rear wall 204, first interlock top end 226 moves away from rear wall 204. The movement of first interlock top end 226 causes first arm 230 to move first input device 110 outward to the second position. Moreover, when first interlock top end 226 moves away from rear wall 204, driver arms 244 move within driver slots 252 such that lockout pad 242 is moved to a locked position wherein lockout pad 242 extends at least partially from housing 202.

Furthermore, control assembly 200 includes a first switch 254 and a second switch 256. Each switch 254 and 256 is coupled to a sidewall 206 and 208, respectively, via a spacer block 258. Moreover, first switch 254 is coupled to first input device 110 such that, when first input device 110 receives the first user input, first switch 254 generates a first signal that causes capacitors 122 to begin charging by storing electrical energy. Similarly, second switch 256 is coupled to second input device 112 such that, when second input device 112 receives the second user input, second switch 256 generates a second signal that cause capacitors 122 to discharge stored electrical energy.

Figure 5:
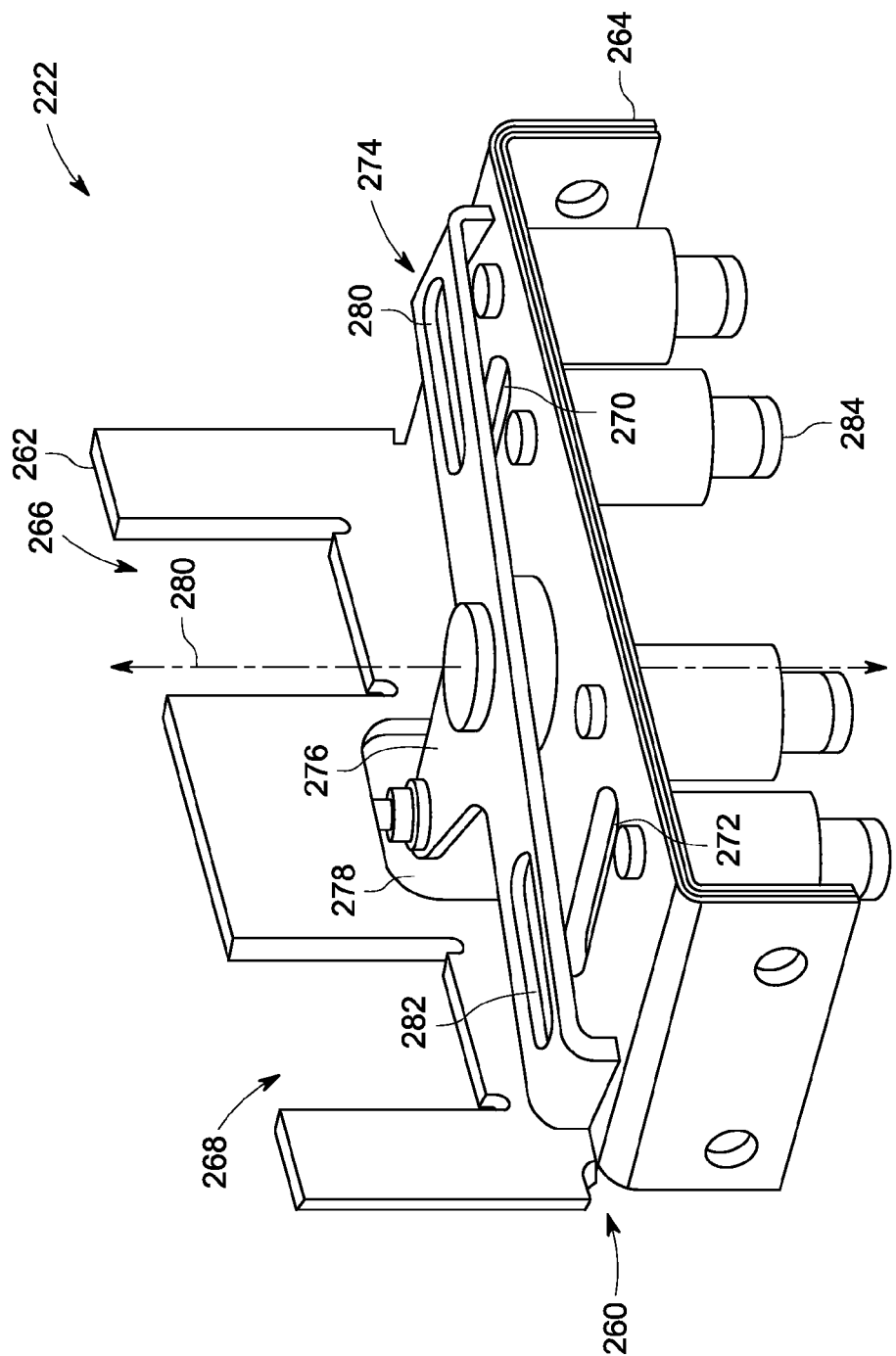
FIG. 5 is a front perspective view of a crank assembly that may be used with the capacitor charge control assembly shown in FIG. 4.

FIG. 5 is a front perspective view of crank assembly 222 that couples first input device 110 and second input device 112 to first lockout portion 214 and second lockout portion 216 (each shown in FIG. 4), respectively. In the exemplary embodiment, crank assembly 222 includes a base 260 having a top portion 262 and a bottom portion 264 that is oriented perpendicularly to top portion 262. Top portion 262 includes a first slot 266 and a second slot 268 that are sized to receive first input device 110 and second input device 112, respectively. Bottom portion 264 includes a first groove 270 and a second groove 272.

Moreover, crank assembly 222 includes a platform 274 that is rotatably coupled to bottom portion 264. Platform 274 includes a tongue portion 276 that is sized to be inserted through a tongue slot 278 in top portion 262. Tongue portion 276 is of sufficient length that platform 274 is prevented from rotating more than a predetermined amount about an axis 280. Platform 274 also includes a first groove 280 and a second groove 282. First input device 110 and first lockout portion 214 are coupled by a post or pin (not shown) that extends through platform first groove 280 and base first groove 270. Similarly, second input device 112 and second lockout portion 216 are coupled by a post or pin that extends through platform second groove 282 and base second groove 272. In the exemplary embodiment, crank assembly 222 also includes a plurality of guide pins 284 that are coupled to bottom portion 264. Each guide pin 284 is sized to be inserted in a corresponding guide slot 220 (shown in FIG. 4) of first lockout portion 214 and second lockout portion 216.

Figure 6:
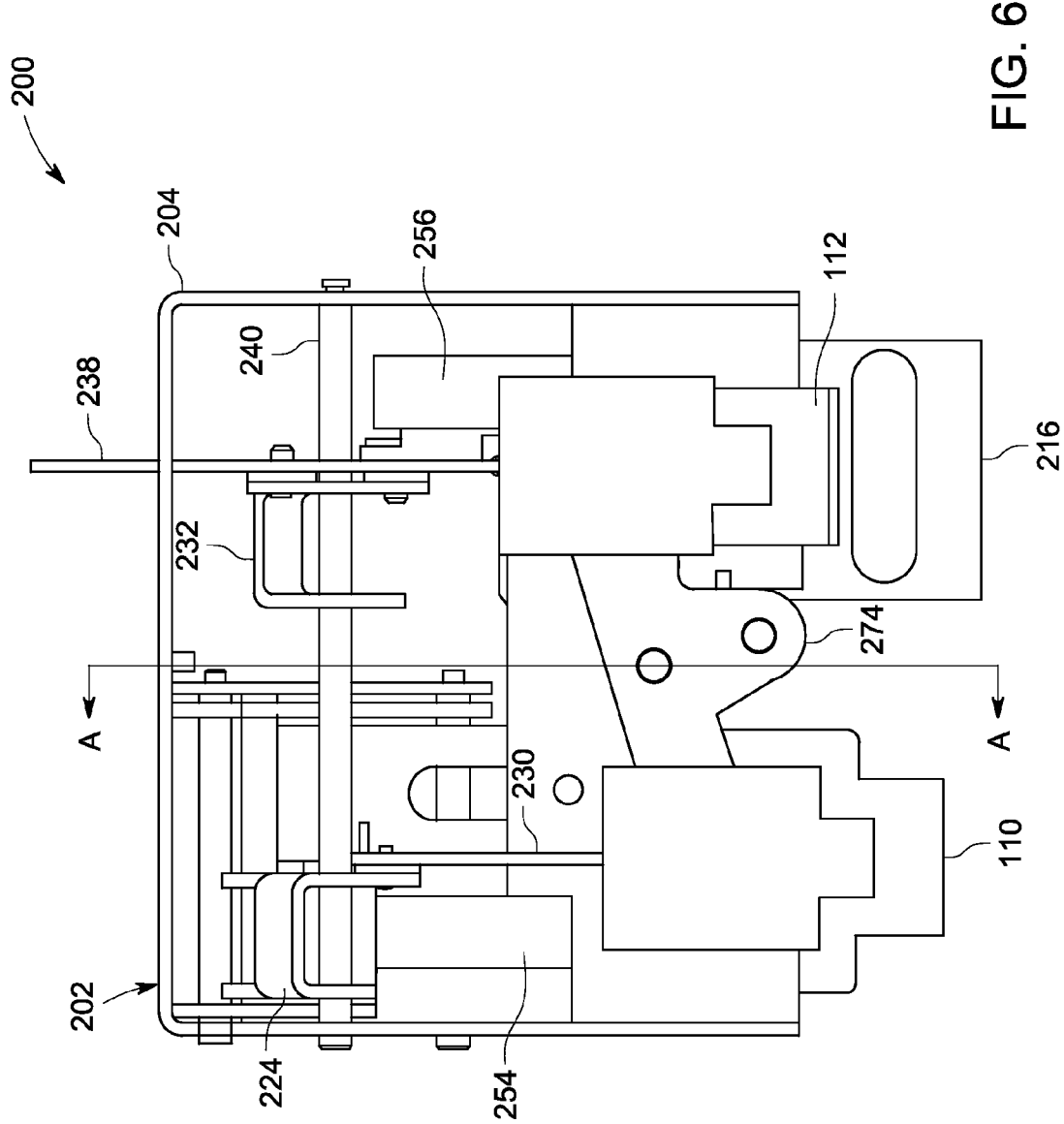
FIG. 6 is a top view of the capacitor charge control assembly shown in FIG. 4 in one operating state.
Figure 7:
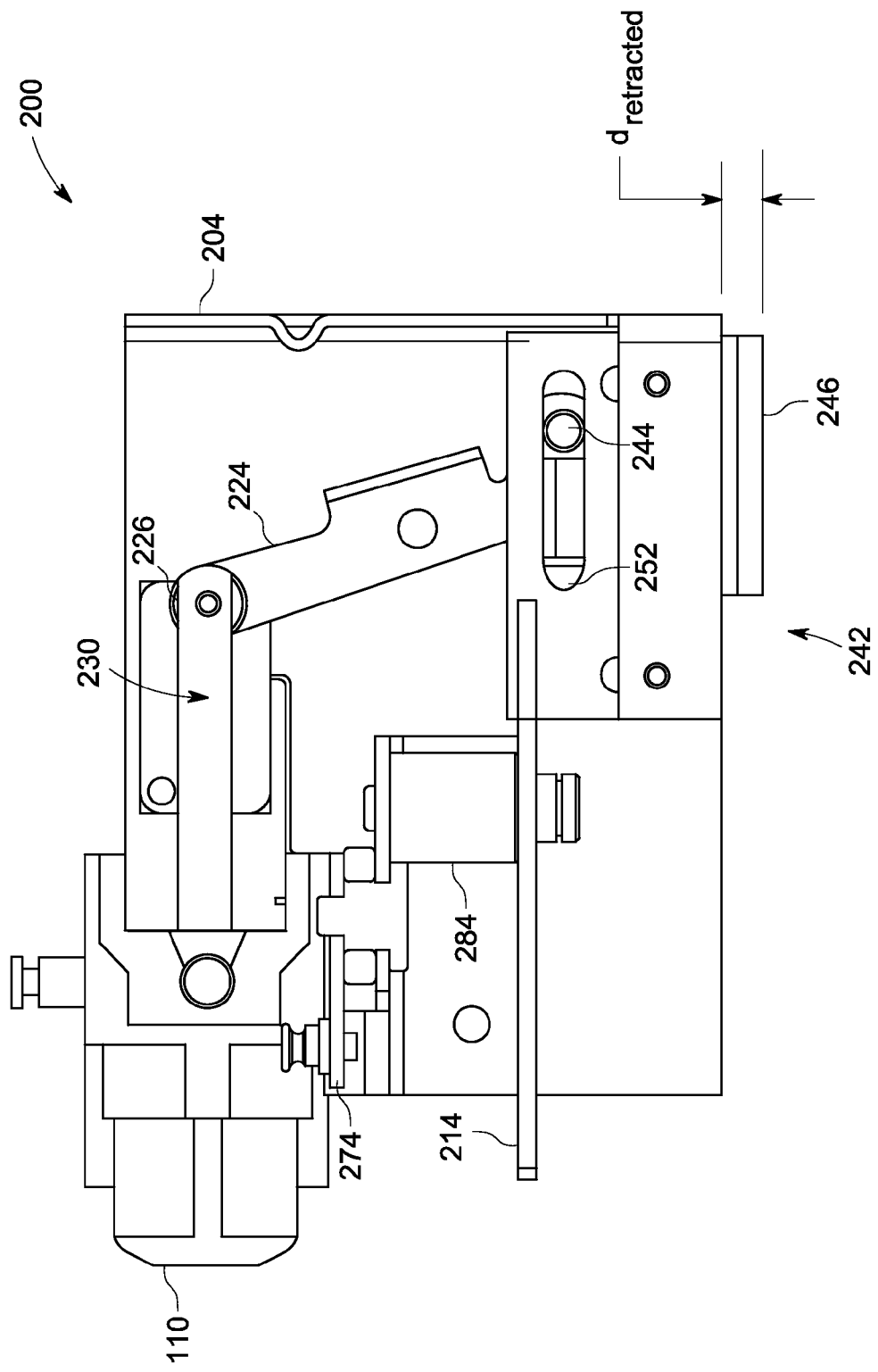
FIG. 7 is a cross-section view of the capacitor charge control assembly in the operating state shown in FIG. 6.

FIG. 6 is a top view of capacitor charge control assembly 200 and FIG. 7 is a cross-section view of charge control assembly along an axis A-A. Specifically, FIGS. 6 and 7 illustrate an operational state of controller 108 (shown in FIGS. 1-3) when capacitors 122 (shown in FIG. 3) are discharged or are discharging stored electrical energy based on a second user input received via second input device 112. The second user input is, in one embodiment, a pressing action on second input device 112 that causes second input device 112 to move to a second position. The movement of second input device 112 causes second switch 256 to generate a second signal and to transmit the second signal to a logic circuit (not shown in FIGS. 6 and 7) that is coupled to PCB 120 (shown in FIG. 3). The logic circuit causes capacitors 122 to discharge stored electrical energy so that circuit protection device 100 (shown in FIG. 1) can be removed from an electrical cabinet (not shown). The logic circuit also causes light devices 116 (shown in FIG. 2) to indicate that capacitors 122 are discharged or are discharging.

Moreover, the movement of second input device 112 causes second arm 238 to move towards rear wall 204, and to partially extend through rear wall 204. The movement of second arm 238 causes second interlock top end 234 to move towards rear wall 204, and also causes second lockout portion 116 to extend to a second position.

Furthermore, the movement of second input device 112 causes platform 274 to rotate about axis 280 (shown in FIG. 5), which causes first input device 110 to move into a first position. The movement of first input device 110 causes first arm 230 to move away from rear wall 204, which also causes first interlock top end 226 to move away from rear wall 204. The movement of first interlock top end 226 causes driver arms 244 to move within driver slots 252 such that lockout pad bottom surface 246 is retracted into housing 202 to an unlocked position that enables an operator to withdraw cassette 106 (shown in FIG. 1) from an equipment cabinet (not shown). When bottom surface 246 is in the unlocked position, bottom surface 246 extends from a bottom plane of control assembly housing 202 by a first distance, $d_{retracted}$.

Figure 8:
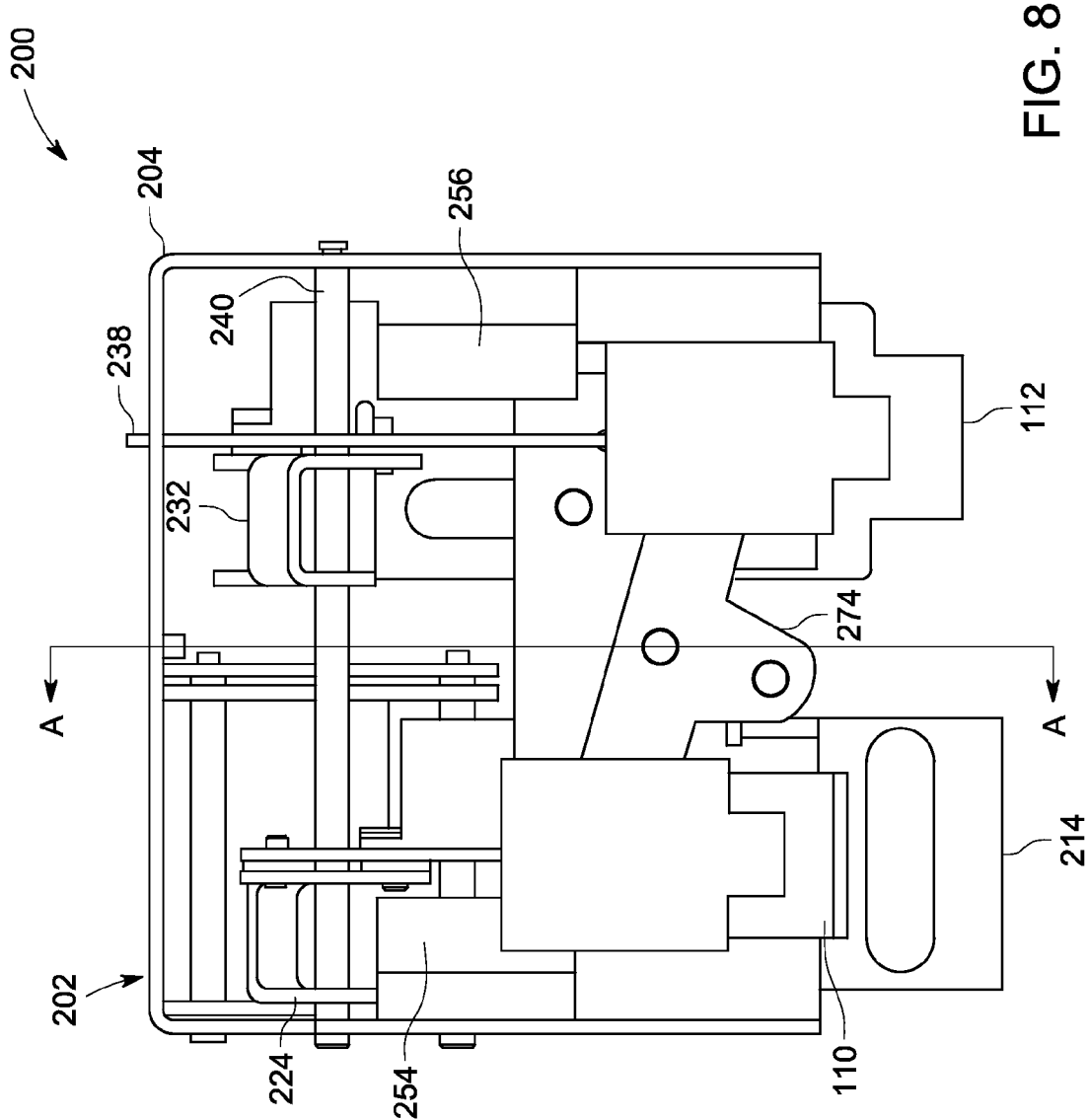
FIG. 8 is a top view of the capacitor charge control assembly shown in FIG. 4 in another operating state.
Figure 9:
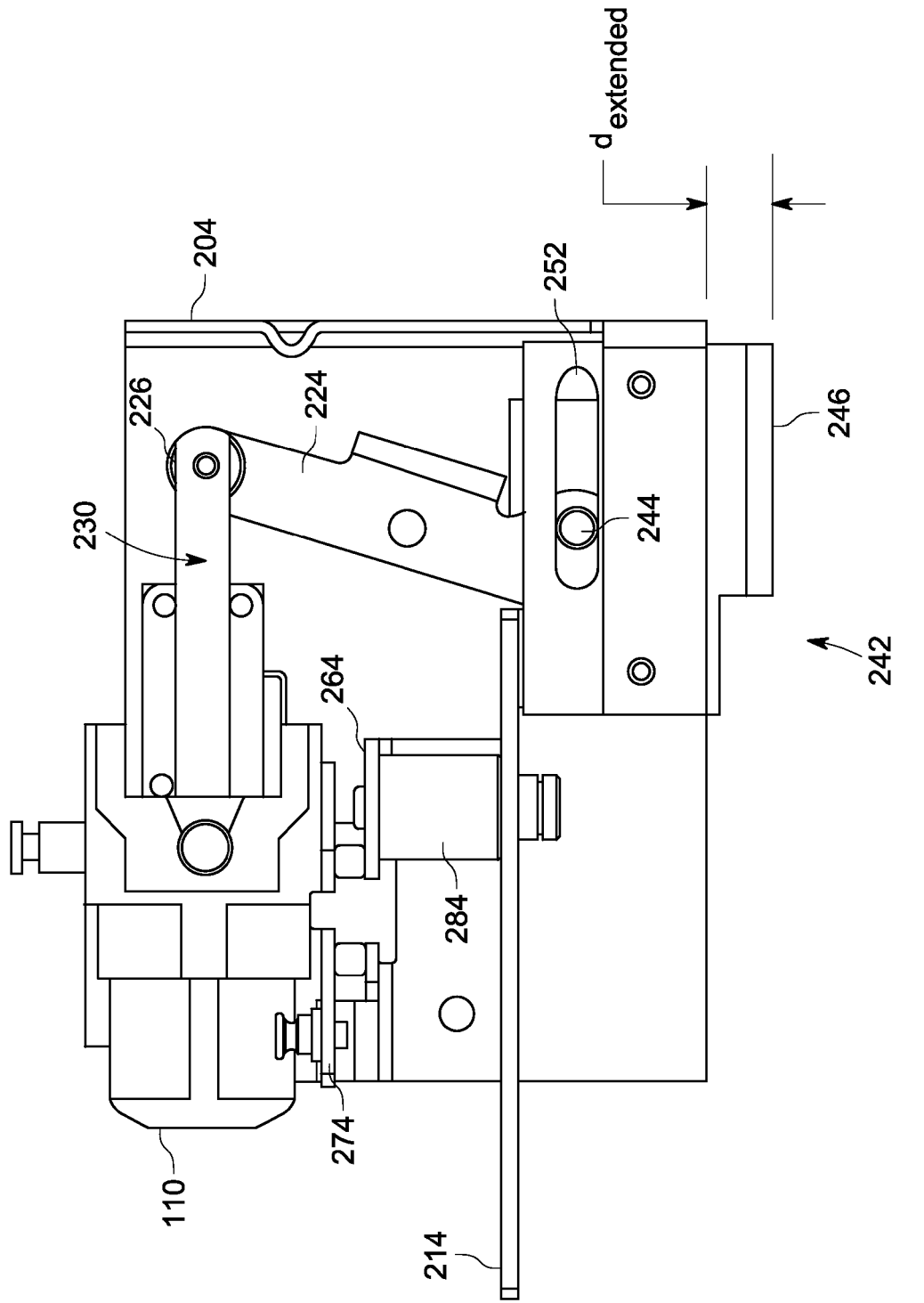
FIG. 9 is a cross-section view of the capacitor charge control assembly in the operating state shown in FIG. 8.

FIG. 8 is a top view of charge control assembly 200 and FIG. 9 is a cross-section view of charge control assembly along an axis A-A. Specifically, FIGS. 8 and 9 illustrate an operational state of controller 108 (shown in FIGS. 1-3) when capacitors 122 (shown in FIG. 3) are charged with stored electrical energy based on a first user input received via first input device 110. The first user input is, in one embodiment, a pressing action on first input device 110 that causes first input device 110 to move from the first position to the second position. The movement of first input device 110 causes first switch 254 to generate a first signal and to transmit the first signal to a logic circuit (not shown in FIGS. 8 and 9) that is coupled to PCB 120 (shown in FIG. 3). The logic circuit causes capacitors 122 to begin storing electrical energy for use in activating circuit protection device 100 (shown in FIG. 1). The logic circuit also causes light devices 116 (shown in FIG. 2) to indicate that capacitors 122 are charged.

Moreover, the movement of first input device 110 causes first arm 230 to move towards rear wall 204. The movement of first arm 230 causes first interlock top end 226 to move towards rear wall 204, and also causes first lockout portion 114 to extend to a second position from a retracted first position. The movement of first interlock top end 226 also causes driver arms 244 to move within driver slots 252 such that lockout pad bottom surface 246 is extended from housing 202 to a locked position. When bottom surface 246 is in the locked position, bottom surface 246 extends from a bottom plane of control assembly housing 202 by a second distance, $d_{extended}$, which is longer than the first distance, $d_{retracted}$. Extending bottom surface 246 facilitates locking circuit protection device 100 in place to prevent attempted removal of circuit protection device 100 from an equipment enclosure when capacitors 122 are charged.

Figure 10:
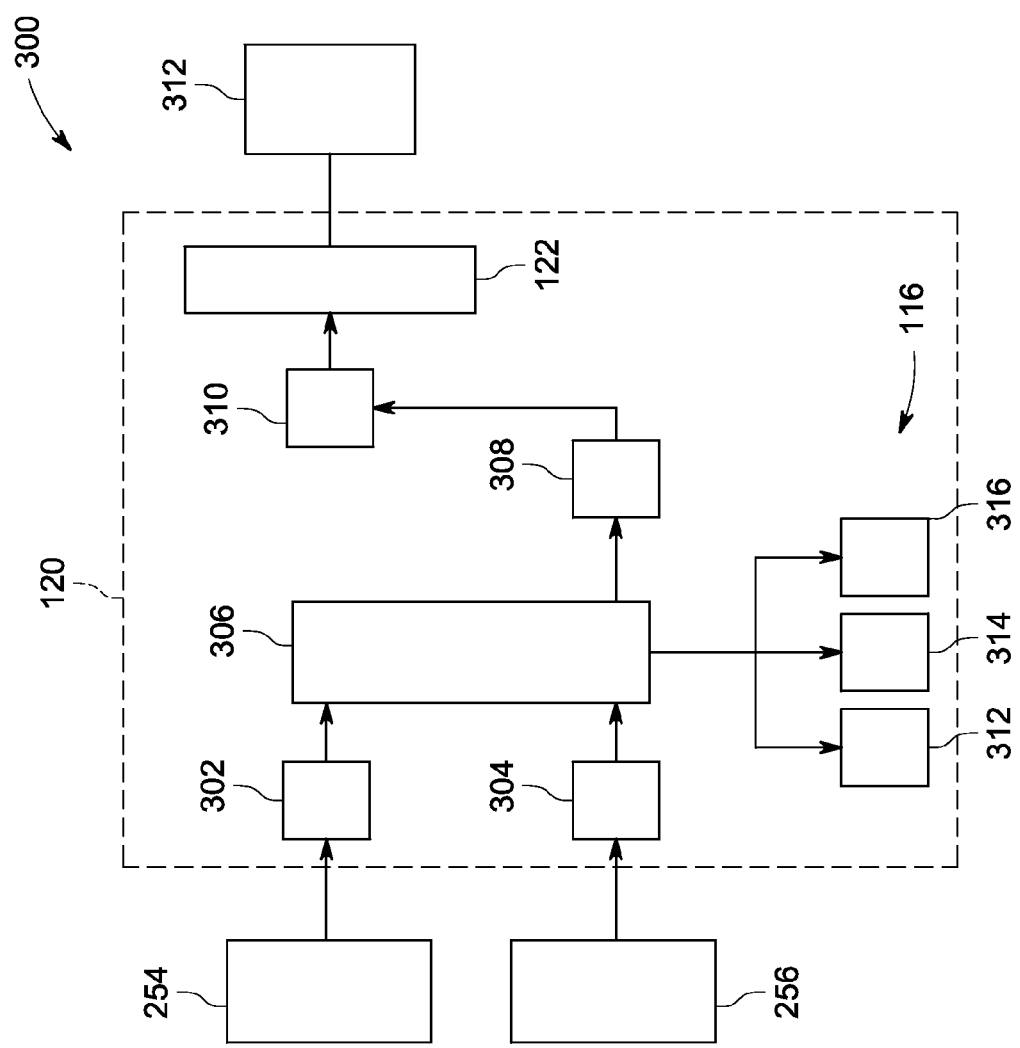
FIG. 10 is a block schematic diagram of an electrical architecture that may be used with the capacitor charge control assembly shown in FIG. 4.

FIG. 10 is a block schematic diagram of an electrical architecture 300 that may be used with charge control assembly 200. In the exemplary embodiment, architecture 300 includes first switch 254 and second switch 256. Switches 254 and 256 are communicatively coupled to PCB 120. In addition, a plurality of optocouplers, including a first optocoupler 302 and a second optocoupler 304, are electrically coupled to PCB 120. Optocouplers 302 and 304 are communicatively coupled to first switch 254 and second switch 256, respectively. Optocouplers 302 and 304 each include a light emitting diode (LED) and a phototransistor within a housing (none shown). When an electrical signal is applied to the input of a corresponding optocoupler, the LED emits light across an isolation barrier. The light is detected by the phototransistor, which generates and transmits a corresponding electrical signal. For example, upon detecting the first user input via first input device 110 (shown in FIG. 2), first switch 254 transmits a first signal to first optocoupler 302. An LED within first optocoupler 302 emits light that is sensed by a phototransistor within first optocoupler 302.

Moreover, architecture 300 includes a logic circuit 306 that is electrically coupled to optocouplers 302 and 304. Logic circuit 306 is communicatively coupled to a discharge capacitor 308. Logic circuit 306 may be any programmable system including systems and microcontrollers, microprocessors, reduced instruction set circuits (RISC), application specific integrated circuits (ASIC), programmable logic circuits (PLC), and any other circuit capable of executing the functions described herein. The above examples are exemplary only, and thus are not intended to limit in any way the definition and/or meaning of the term logic circuit.

In the exemplary embodiment, discharge capacitor 308 is also communicatively coupled to capacitors 122 to provide a discharge control signal to capacitors 122 in response to the first user input via first input device 110. Furthermore, capacitors 122 are electrically coupled to a field effect transistor 310, such as a P-channel metal-oxide-semiconductor field-effect transistor (MOSFET). Capacitors 122 are also electrically coupled to a plasma gun 312 that is used to initiate an arc within containment assembly 102 (shown in FIG. 1). Light devices 116 are also communicatively coupled to logic circuit 306. As shown in FIG. 10, light devices 116 include a first light device 312, a second light device 314, and a third light device 316. First light device 312 is activated by logic circuit 306 when capacitors 122 are discharged in response to the first user input. Second light device 314 is activated by logic circuit 306 when capacitors 122 are charging in response to the second user input, and third light device 316 is activated by logic circuit 306 when capacitors 122 are charged in response to the second user input.

During operation, a first user input is received via first input device 110 and a first signal is transmitted by first switch 254 to first optocoupler 302. The LED of first optocoupler 302 emits light in response to the first signal, and the phototransistor of first optocoupler 302 detects the light and generates a signal representative of the first signal. The phototransistor transmits the signal to logic circuit 306. Logic circuit 306 transmits a signal to discharge capacitor 308, and discharge capacitor 308 transmits a discharge signal to field effect transistor 310. In response to the discharge signal, field effect transistor 310 is triggered such that capacitors 122 bleed off stored energy to ground. Moreover, logic circuit 306 activates first light device 312 to indicate that capacitors 122 are discharged and circuit protection device 100 can be safely unracked from its installed position.

Moreover, a second user input can be received via second input device 112, which causes second switch 256 to transmit a second signal to second optocoupler 304. The LED of second optocoupler 304 emits light in response to the second signal, and the phototransistor of second optocoupler 304 detects the light and generates a signal representative of the second signal. The phototransistor transmits the signal to logic circuit 306. Logic circuit 306 causes capacitors 122 to store energy, and also activates second light device 314 to indicate that capacitors 122 are charging. When capacitors 122 are charged, logic circuit 306 activates third light device 316 to indicate that capacitors 122 are charged.

Exemplary embodiments of apparatus and methods for controlling a charge status of a plurality of capacitors used in a circuit protection device are described above in detail. The apparatus and methods are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Although the present invention is described in connection with an exemplary power equipment protection system environment, embodiments of the invention are operational with numerous other general purpose or special purpose power equipment protection system environments or configurations. The power equipment protection system environment is not intended to suggest any limitation as to the scope of use or functionality of any aspect of the invention. Moreover, the power equipment protection system environment should not be interpreted as having any dependency or requirement relating to any one or combination of components illustrated in the exemplary operating environment.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A capacitor charge control assembly for use with a circuit protection device that includes at least one activation capacitor, said control assembly comprising:
   at least one input device configured to receive a first user input and a second user input;
   a linkage assembly coupled to said at least one input device such that said at least one input device is movable between a first position and a second position; and
   at least one switch coupled to said at least one input device and configured to generate one of a first signal and a second signal, wherein the first signal is based on the first user input and the second signal is based on the second user input, and wherein the first signal causes the at least one activation capacitor to discharge stored energy and the second signal causes the at least one activation capacitor to store energy.

2. A capacitor charge control assembly in accordance with claim 1, wherein said at least one input device comprises a first input device configured to receive the first user input and a second input device configured to receive the second user input, and wherein said at least one switch comprises:
   a first switch coupled to said first input device, wherein said first switch is configured to transmit the first signal when the first user input causes said first input device to move from the first position to the second position; and
   a second switch coupled to said second input device, wherein said second switch is configured to transmit the second signal when the second user input causes said second input device to move from the first position to the second position.

3. A capacitor charge control assembly in accordance with claim 1, wherein said at least one input device comprises a first input device configured to receive the first user input and a second input device configured to receive the second user input, and wherein said linkage assembly is coupled to said first input device and said second input device such that said second input device is in the second position when said first input device is in the first position.

4. A capacitor charge control assembly in accordance with claim 3, wherein said linkage assembly is coupled to said first input device and said second input device such that said second input device moves from the second position to the first position when the first user input causes said first input device to move from the first position to the second position.

5. A capacitor charge control assembly in accordance with claim 1, further comprising at least one lockout portion coupled to said linkage assembly such that said at least one lockout portion is movable between a first lockout position and a second lockout position based on a position of said at least one input device.

6. A capacitor charge control assembly in accordance with claim 5, wherein said at least one input device comprises a first input device and a second input device, and said at least one lockout portion comprises a first lockout portion and a second lockout portion, and wherein said first lockout portion is in the first lockout position and said second lockout portion is in the second lockout position when said first input device is in the first position.

7. A capacitor charge control assembly in accordance with claim 1, further comprising a lockout pad coupled to said linkage assembly such that said lockout pad is movable between a locked position and an unlocked position based on a position of said at least one input device.

8. A capacitor charge control assembly in accordance with claim 7, wherein said lockout pad is in an extended position when said at least one input device is in the second position.

9. A controller for use with a circuit protection device, said controller comprising:
    a logic circuit;
    a plurality of capacitors electrically coupled to said logic circuit and configured to activate the circuit protection device; and
    a charge control assembly comprising:
        at least one input device configured to receive a first user input and a second user input;
        a linkage assembly coupled to said at least one input device such that said at least one input device is each movable between a first position and second position; and
        at least one switch coupled to said at least one input device and configured to generate a first signal based on the first user input and a second signal based on the second user input, wherein the first signal causes said plurality of capacitors to discharge stored energy and the second signal causes said plurality of capacitors to store energy.

10. A controller in accordance with claim 9, wherein said at least one input device comprises a first input device and a second input device, and said at least one switch comprises a first switch coupled to said first input device and a second switch coupled to said second input device, and wherein said first switch is configured to generate the first signal when the first user input causes said first input device to move from the first position to the second position, and wherein said second switch is configured to generate the second signal when the second user input causes said second input device to move from the first position to the second position.

11. A controller in accordance with claim 9, wherein said at least one input device comprises a first input device and a second input device, and wherein said linkage assembly is coupled to said first input device and said second input device such that said second input device is in the second position when said first input device is in the first position, and such that said second input device moves from the second position to the first position when the first user input causes said first input device to move from the first position to the second position.

12. A controller in accordance with claim 9, wherein said charge control assembly further comprises at least one lockout portion coupled to said linkage assembly such that said at least one lockout portion is movable between a first lockout position and a second lockout position based on a position of said at least one input device.

13. A controller in accordance with claim 9, wherein said charge control assembly further comprises a lockout pad coupled to said linkage assembly such that said lockout pad is movable between a locked position and an unlocked position based on a position of said at least one input device.

14. A controller in accordance with claim 9, further comprising a plasma gun configured to emit a plasma within the circuit protection device, wherein said plasma gun is electrically coupled to said plurality of capacitors, and wherein said plurality of capacitors is configured to provide power to said plasma gun to trigger emission of the plasma.

15. A controller in accordance with claim 9, further comprising at least one light device communicatively coupled to said logic circuit, wherein said at least one light device is configured to indicate a charge status of said plurality of capacitors.

16. A method of assembling a capacitor charge control assembly for use with a circuit protection device that includes a plurality of activation capacitors, said method comprising:
    coupling a linkage assembly to at least one input device such that the at least one input device is movable between a first position and second position; and
    coupling a switch to the at least one input device, wherein the switch is configured to generate a first signal based on a first user input and a second signal based on the second user input, wherein the first signal causes the plurality of capacitors to discharge stored energy and the second signal causes the plurality of capacitors to store energy.

17. A method in accordance with claim 16, wherein the at least one input device includes a first input device and a second input device, and the switch includes a first switch coupled to the first input device and a second switch coupled to the second input device, and wherein coupling the switch to the at least one input device comprises:
    configuring the first switch to generate the first signal when the first user input causes the first input device to move from the first position to the second position; and
    configuring the second switch to generate the second signal when the second user input causes the second input device to move from the first position to the second position.

18. A method in accordance with claim 16, wherein the at least one input device includes a first input device and a second input device, and wherein coupling a linkage assembly to at least one input device comprises coupling the linkage assembly such that the second input device is in the second position when the first input device is in the first position, and such that the second input device moves from the second position to the first position when the first user input causes the first input device to move from the first position to the second position.

19. A method in accordance with claim 16, further comprising coupling at least one lockout portion to the linkage assembly such that the at least one lockout portion is movable between a first lockout position and a second lockout position based on a position of the at least one input device.

20. A method in accordance with claim 16, further comprising coupling a lockout pad to the linkage assembly such that the lockout pad is movable between a locked position and an unlocked position based on a position of the at least one input device.

* * * * *